United States Patent
Herron

(10) Patent No.: US 7,635,838 B2
(45) Date of Patent: Dec. 22, 2009

(54) METHODS AND APPARATUS FOR EXPLORING GEOLOGICAL FORMATIONS UTILIZING STRONTIUM MEASUREMENTS

(75) Inventor: Michael M. Herron, Ridgefield, CT (US)

(73) Assignee: Schlumberger Technology Corporation, Cambridge, MA (US)

( * ) Notice: Subject to any disclaimer, the term of this patent is extended or adjusted under 35 U.S.C. 154(b) by 0 days.

(21) Appl. No.: 12/044,698

(22) Filed: Mar. 7, 2008

(65) Prior Publication Data

US 2009/0168955 A1 Jul. 2, 2009

Related U.S. Application Data

(60) Provisional application No. 61/017,834, filed on Dec. 31, 2007.

(51) Int. Cl.
*G01V 5/04* (2006.01)
*G01V 5/08* (2006.01)

(52) U.S. Cl. .................. 250/269.1; 250/261
(58) Field of Classification Search .......... 250/269.1, 250/261
See application file for complete search history.

(56) References Cited

U.S. PATENT DOCUMENTS 3,061,725 A * 10/1962 Green ............... 250/265
4,510,573 A   4/1985 Boyce et al.
5,929,437 A * 7/1999 Elliott et al. ............ 250/259
2003/0058990 A1 * 3/2003 Kaiser et al. ............. 378/45

OTHER PUBLICATIONS

Eberhard Gischler, "Subsurface Geology of a Prograding Carbonate Platform Margin, Great Bahama Bank: Results of the Bahamas Drilling Project," 2002, Society for Sedimentary Geology, pp. 526-527.*
Michael Evans et al., "Support for tropically-driven Pacific decadel variability based on paleoproxy evidence", Geophysical Research Letters, vol. 28, No. 19, pp. 3689-3692, Oct. 2001.
Heather Stoll et al., "Sr/Ca variations in cretaceous carbonates: relation to productivity and sea level changes", Palaeogeography, Palaeoclimatolog, Palaeoecology 168 (2001, pp. 311-336.
Newnham, L et al, "Development and application of energy-dispersive x-ray fluorescence borehole loggers and drill core analysers at the Renison tin mine in Tasmania", International Journal of Applied Radiation and Isotops, Pergamon Press, New York, NY vol. 34, No. 1, Jan. 1983, pp. 345-352.

(Continued)

*Primary Examiner*—David P Porta
*Assistant Examiner*—Mindy Vu
(74) *Attorney, Agent, or Firm*—Brigid Laffey; James McAleenan; Jody DeStefanis

(57) ABSTRACT

Formation strontium concentrations are measured utilizing a borehole tool. A log may be provided as a function of depth or distance. The strontium measurements can be correlated chronostratigraphically to provide a depth to absolute time correlation. Measures of strontium made in the borehole can be correlated to information obtained via seismic exploration of the formation traversed by the borehole. Measures of strontium in multiple boreholes of a single formation can be correlated.

20 Claims, 4 Drawing Sheets

OTHER PUBLICATIONS

Fabbi BP, "X-ray fluorescence determination of barium and strontium in geologic samples", Applied Spectroscopy, vol. 25, No. 3, May 1971 pp. 316-318.

Tronicke J et al., "Integrating surface georadar and crosshole radar tomography: A validation experiment in braided stream deposits", Geophysics Soc Exploration Geophysicists, vol. 67, No. 5, Sep. 2002, pp. 1516-1523.

Alvarex G et al., "Lithologic characterization of a reservoir using continuous-wavelet transforms", IEEE Transactions on Geoscience and Remote Sensing IEEE USA, vol. 41, No. 1, Jan. 2003, pp. 59-65.

Wilson R, et al., "Spectral shape analysis for contaminant logging at the hanford site", IEEE Transactions on Nuclear Science, IEEE Service Center, New York, NY, vol. 45, No. 3, Jun. 1998, pp. 997-1001.

Turek A, et al, "Determination of Rb and Sr by X-ray fluorescence in the measurement of radiometric ages", Canadian Journal of Spectroscopy Canada, vol. 22, No. 1, Jan. 1977, pp. 20-24.

Patent Cooperation Treaty, International Search Report, dated Oct. 7, 2009, 4 pages.

* cited by examiner

Bahamas – Seismic Stratigraphy

METHODS AND APPARATUS FOR EXPLORING GEOLOGICAL FORMATIONS UTILIZING STRONTIUM MEASUREMENTS

CROSS-REFERENCE TO RELATED APPLICATIONS

This application claims benefits of priority from U.S. Patent Application 61/017,834, entitled "METHODS AND APPARATUS FOR EXPLORING GEOLOGICAL FORMATIONS UTILIZING STRONTIUM MEASUREMENTS," filed on Dec. 31, 2007, which is commonly assigned to assignee of the present invention and hereby incorporated by reference in its entirety.

BACKGROUND OF THE INVENTION

1. Field of the Invention

This invention relates broadly to geophysics. More particularly, this invention relates to the investigation of subsurface formations through the use of strontium measurements.

2. State of the Art

In exploring an earth formation it is desirable to obtain as much information regarding the formation as possible. One manner of obtaining information of the formation is to drill boreholes in the formation and to utilize borehole tools such as neutron tools, gamma ray tools, resistivity tools, imaging tools, etc. to provide the information. These tools are very useful in obtaining information regarding the formation directly adjacent the borehole, and information logs over borehole depth (or distance) are obtained. The borehole logs, however, do not typically provide a wide horizontal analysis of the formation.

To obtain a wide horizontal analysis of a formation, seismic sources and detectors are often utilized. Seismic logging provides information over large distances and depths in the formation, but seismic logging has a low resolution compared to borehole logging. The output of a seismic log generally provides those skilled in the art with an indication of surfaces or layers of constant time (i.e., chronostratigraphic) as opposed to information at a particular formation (lithostratigraphic).

SUMMARY OF THE INVENTION

According to one aspect of the invention, methods and apparatus are provided for correlating formation depth to formation chronostratigraphic information.

According to another aspect of the invention, methods and apparatus are provided for correlating formation seismic information to borehole depth information.

According to a further aspect of the invention, methods and apparatus are provided for correlating information from different boreholes in a formation using chronostratigraphic determinations.

In accordance with an additional aspect of the invention, elemental measurements made using a borehole tool are utilized to provide chronostratigraphic information.

According to yet another aspect of the invention, information correlating a depth of the borehole or formation to chronostratigraphy is used in analyzing a seismic profile which shows seismic stratigraphic layers of constant time but which has uncertainty with respect to the depth of such layer horizons.

In accord with these aspects of the invention which will be discussed in detail below, a measure of strontium is made in the borehole utilizing one or more borehole tools. In one embodiment, the measure of strontium is made using an X-ray fluorescence tool. In another embodiment, the measure of strontium is made using a capture gamma ray spectroscopy tool. In a further embodiment, the measure of strontium is made using a delayed neutron activation tool. In yet another embodiment, a combination of the aforementioned tools is utilized. According to another aspect of the invention, the measure of strontium along the depth of the borehole is correlated chronostratigraphically to provide a depth to absolute time correlation. In one embodiment, information such as sea level curves over time is used to make this correlation. According to another aspect of the invention, measures of strontium in a borehole are used to correlate to information obtained via seismic exploration of the formation traversed by the borehole. According to another aspect of the invention, measures of strontium in multiple boreholes are correlated.

Advantages of the invention will become apparent to those skilled in the art upon reference to the detailed description taken in conjunction with the provided figures.

DETAILED DESCRIPTION OF THE PREFERRED EMBODIMENTS

Figure 1:
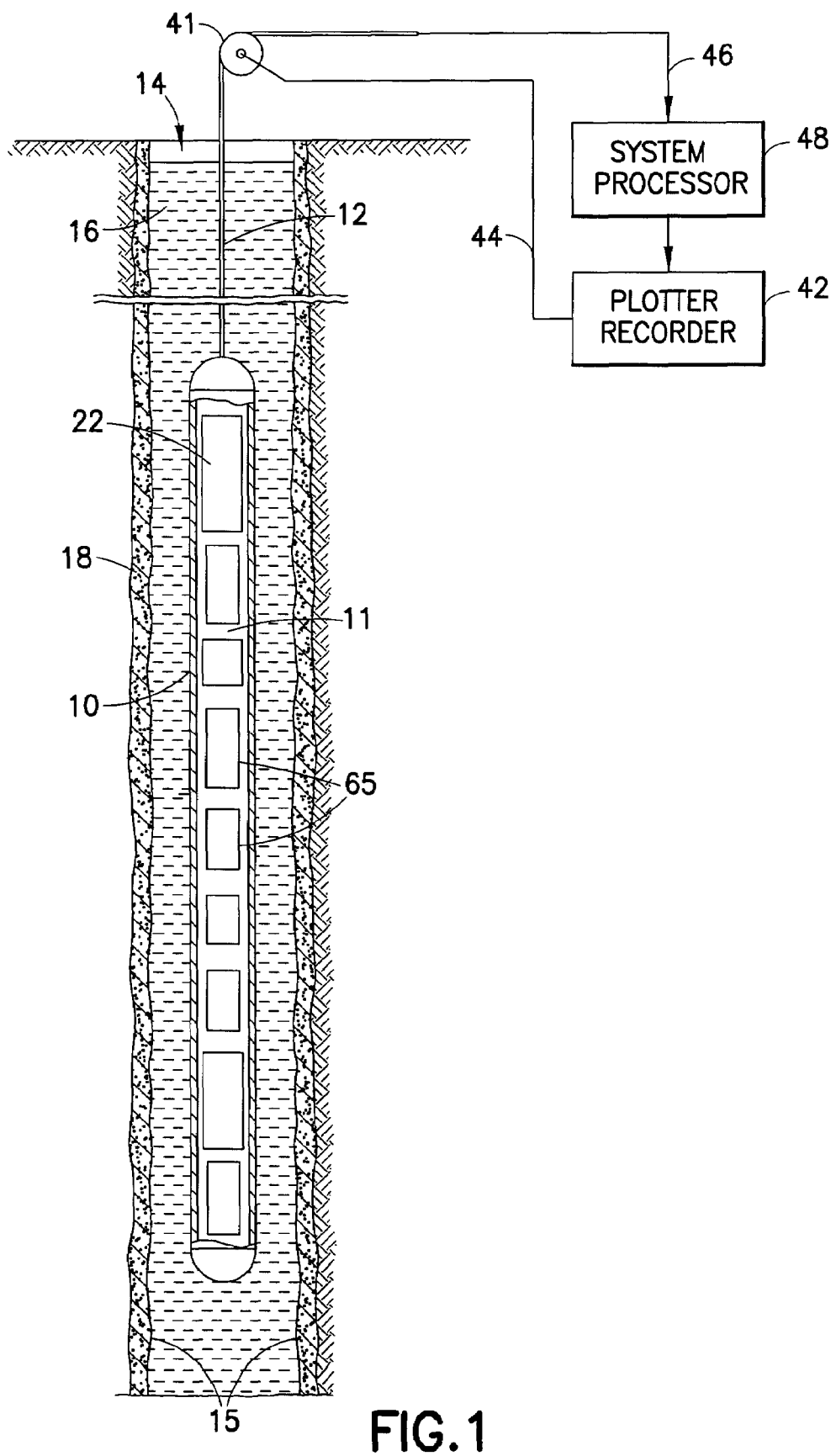
FIG. 1 is a schematic diagram of a borehole tool located in a borehole traversing a formation in accord with the invention.

Prior to referring to the figures, it is useful to set forth certain observations believed to be helpful in understanding the invention.

Much work has been done over the last twenty years regarding quantitative determination of mineralogy utilizing in situ elemental analysis of a formation traversed by a borehole. In particular, core samples have been obtained from various boreholes and analyzed in great detail as to their mineralogy and their elemental constitutions. Then, various spectroscopy tools which take advantage of capture spectroscopy and inelastic spectroscopy have been utilized to provide a wealth of information regarding the amounts of various elements found at different depths in the formation. For example, capture spectroscopy tools have regularly obtained information regarding the amounts of Si, Ca, Fe, S, Ti, Gd, H, Cl, and even Al, Na, Mg, Mn, and Ni, while inelastic spectroscopy tools have regularly obtained information regarding the amounts of C, O, Si, Ca, and Fe. Using the spectroscopy information in conjunction with the mineralogy knowledge gained from the core samples, it has been possible to make relatively accurate in situ determinations of the mineralogy of the formation.

One piece of information that has been recognized by the inventor(s) hereof as particularly useful is that various elements vary in certain quantity ranges in an earth formation. For example, in certain formations (e.g., carbonates), the weight fraction of calcium will vary between 20% to 40%. Other elements will have a considerably larger range. However, strontium appears to be unique in varying over an extreme range in carbonate formations from under 100 ppm to over 20% weight fraction of the formation which represents a factor of over 5 million.

Strontium (Sr) is an alkaline earth metal that occurs naturally in the minerals celestite $SrSO_4$ and strontianite $SrCO_3$. Strontium often substitutes for calcium in a lattice such that high magnesium calcite (i.e., high magnesium calcium carbonate) and aragonite (which is a polymorph of calcium carbonate) are rich in strontium. Strontianite often constitutes approximately 40% of aragonite. It is believed by the inventor (s) that strontium provides chronostratigraphic information. More particular, in a carbonate platform setting, sea level changes may be reflected by strontium concentrations. Typically, upon deposition (at formation) strontium levels on a platform might be about 1000 to 2000 ppm. When sea levels rose (e.g., due to melting of ice caps), the global mass of aragonite and high magnesium calcite increased thereby pulling strontium from the ocean and reducing the concentration of strontium in seawater. When sea levels fell (e.g., due to ice ages), the aragonite and high magnesium calcite were exposed, thereby permitting rain to dissolve these minerals thereby releasing strontium. Some of the strontium precipitated at the sea interface (new sea level) as celestite, and some was released into the seawater. Because of the precipitate, extremely high strontium levels in the platform corresponding to this sea level fall were generated and can now be detected.

In basins far from the platform, low magnesium calcite with strontium levels of about 300 ppm are dominant. With rising seal levels, strontium was removed from the ocean by the growing platforms, so the basin strontium concentration declined to nominally 250 ppm. When sea levels fell and strontium was released by the dissolving aragonite at the platform, the basin strontium increased to nominally 350 ppm. These changes in sea water strontium concentration may be reflected in the basinal strontium concentration profiles.

It will be appreciated by those skilled in the art that diagenesis and mineralogy affect strontium content. Diagenesis refers to the chemical, physical, or biological change undergone by a sediment after its initial deposition and during and after its lithification (exclusive of weathering). Exposure to meteoric water during diagenesis is believed to have dissolved aragonite and high magnesium carbonates and released strontium. Some of the released strontium precipitated at the water line as celestite, and the remainder is believed to have been released into the seawater. Likewise deep conversion of aragonite and high magnesium carbonates to low magnesium carbonates or dolomite during diagenesis is believed to have released strontium into the system. However, some information on the original strontium concentrations might have been retained. Thus, this observation indicates that mineralogy has impact on strontium content. Other mineralogy likewise affects observed strontium concentrations. For example, anhydrite tends to have about 1000-1100 ppm strontium, so anhydrite can be a major contributor to the strontium concentration of the formation as a whole. Quartz has little strontium, so quartz acts to lower the total concentration.

Turning now to FIG. 1, an illustrative embodiment of the apparatus embodying the overall method of the present invention is shown in the form of a logging tool string 10 suspended by an armored cable 12 in the borehole 14. The borehole is typically filled with drilling mud 16 and is surrounded by an earth formation 18. During drilling, the drilling mud deposits a layer of material on the borehole wall in the form of a mud cake 15. At the outset, it should be understood that reference herein to tools, detectors, tool systems, and the like are not to be construed as defining limitations on whether a particular function is to be performed by a single device or a plurality of devices, or whether such devices are contained within a single tool, or a plurality of tools drawn through the borehole 14 in tandem. For convenience, the term "tool system" as used herein, shall refer to one or more individual devices that acquire and process data from the formation or borehole for use in determining a specific property or quantity of interest. The tool system is to be understood to be broadly construed regarding the manner in which data is acquired, transmitted and processed. Thus, the tool system might comprise a measurement or logging while drilling tool, might send information via pressure pulses in borehole mud, or via a wireline, or wirelessly, and might process the information downhole or uphole. Similarly, it should be understood that the term "borehole" is not to be construed as defining a limitation to the hole traversing the formation, provided the tool system is capable of acquiring the desired information as it traverses the borehole. Thus, a "borehole" is to be understood in its broadest sense to include uncased and cased boreholes, finished and unfinished wells, etc.

Returning to FIG. 1 and as shown therein by way of example only, the tool string 10 generally comprises an elongated housing 11 including, at the top, a communication cartridge 22 and one or more tool systems designed to acquire data related to the formation 18. While the tool string 10 is moved through the borehole 14, an indication of its depth or distance in the borehole is provided by a depth or distance determining apparatus, generally indicated at 41, which is responsive to movement of the cable 12 as it is let out and reeled in by a winch (not shown). The depth determining apparatus 41 is connected to a plotter/recorder 42 by a conventional, well-known cable-following device 44.

Figure 2:
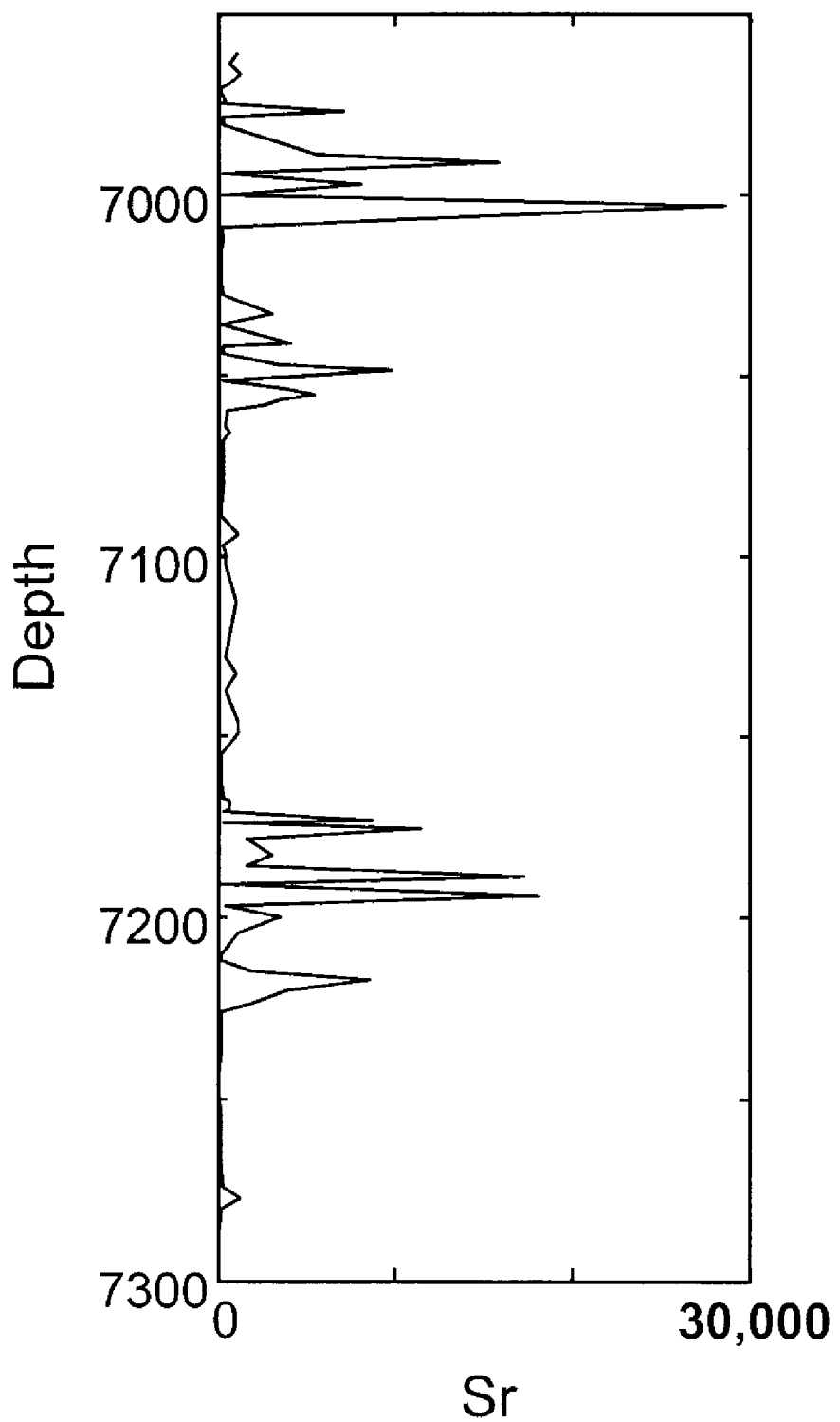
FIG. 2 is a log indicating strontium levels as a function of borehole depth

The data gathered by the different tool systems in the string 10 are initially processed in the communication cartridge 22 and transmitted through the cable 12, by means of communication line 46 into the system processor 48. The system processor 48 is typically located above ground and operates in real time. The function of the system processor 48 for purposes of the present invention is to determine the strontium concentrations in the formation and store values thereof as a function of formation depth. The system processor 48 may be implemented using one or more of a computer, dedicated hardware, data storage elements, software, or other well-known elements. A plot or recording of the strontium concentrations at various depths within the borehole can be made at 42. An example of what such a plot (log) would look like is seen in FIG. 2 (albeit that the data for generating FIG. 2 was taken from core samples as opposed to a downhole tool).

The tool string 10 may include one or more tool systems arranged along the string 10. While many different tool systems may be utilized, in accord with the invention, the tool string 10 of the invention includes at least one tool system 65 capable of measuring the strontium content of the earth formation adjacent the borehole. In one embodiment of the invention, the tool system capable of measuring strontium comprises an X-ray fluorescence spectroscopy tool such as described in U.S. Pat. No. 4,510,573 to Boyce et al. which is hereby incorporated by reference herein in its entirety, which is modified to identify strontium. Alternatively, the X-ray fluorescence spectroscopy tool may be a currently available hand-held type X-ray fluorescence spectroscopy instrument which is suitably adapted for use in a borehole. In either case, one or more signature spectral peaks such as the k-alpha X-ray spectral peak at 14.2 keV characteristic of strontium are preferably used to identify and provide the quantity of strontium in the formation. Other X-ray peaks characteristic of strontium could also be used. According to another embodiment of the invention, the tool system capable of measuring strontium comprises a delayed neutron activation tool such as the GLT (a trademark of Schlumberger) which is modified to detect strontium through the capture of a thermal neutron and the delayed release of a characteristic gamma ray. According to yet another embodiment of the invention, the tool system capable of measuring strontium comprises a capture gamma ray spectroscopy tool such as the ECS (a trademark of Schlumberger) which is modified to detect strontium. In this case, the gamma ray spectrum is characteristic of the prompt gamma rays released by the strontium. According to an even further embodiment of the invention, the tool system capable of measuring strontium includes two or all three of the aforementioned tools.

Figure 3:
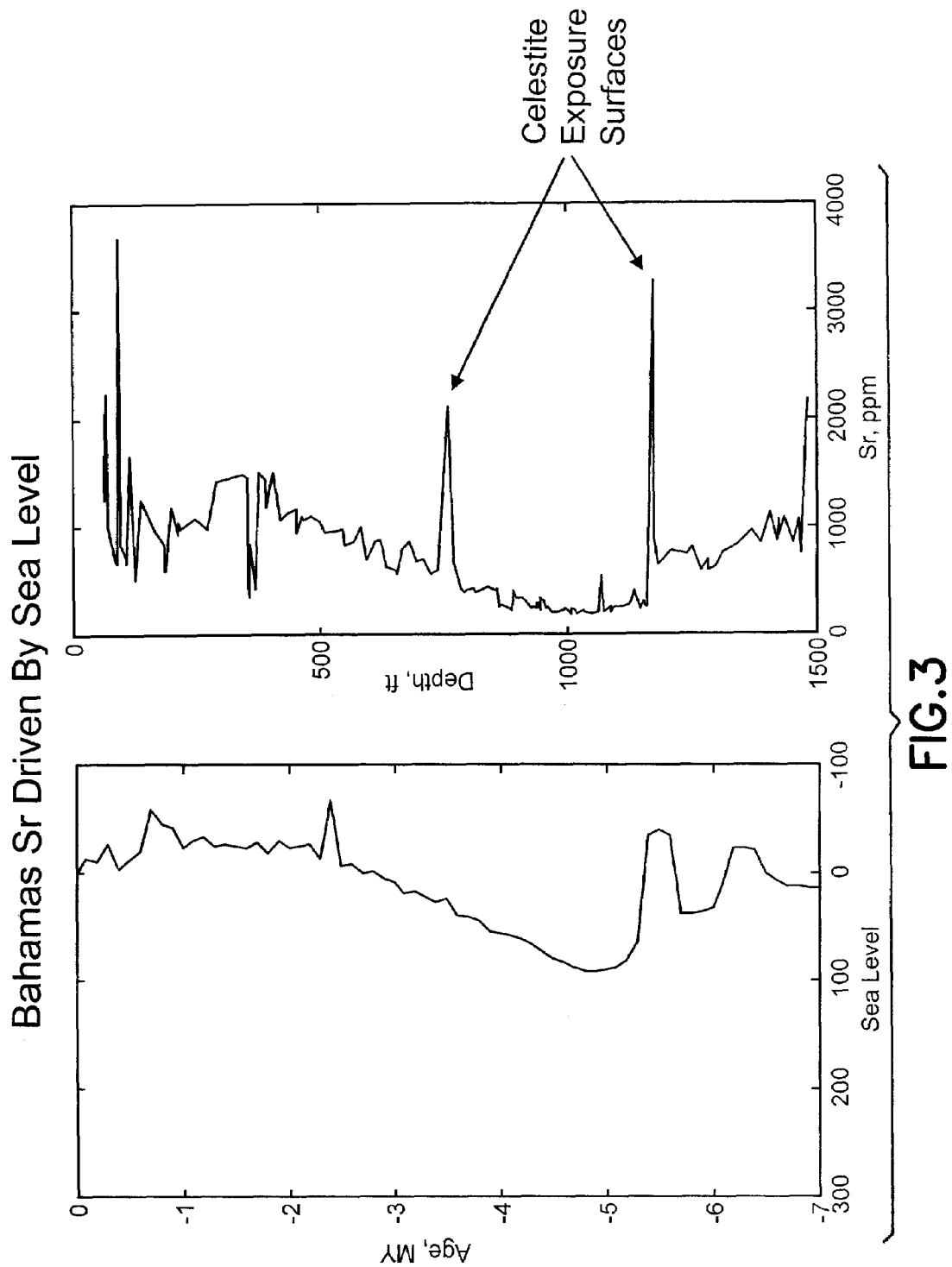
FIG. 3 is a composite of a first chart showing sea level elevations versus time and a second chart showing strontium readings versus formation depth in an analyzed formation.

According to one aspect of the invention, the measurement of strontium in the formation along the depth of the borehole may be correlated chronostratigraphically to provide a depth to absolute time correlation. As seen in the left-hand chart of FIG. 3, data relating to the levels of the oceans over millions of years is generally known. See, Haq et al, *Science*, v 235, 4793, pp. 1156-1167. By comparing a formation such as the Bahamas formation whose depth generally correlates to age (e.g., about 215 feet every one million years), and by finding the strontium levels in the formation as seen in the right-hand chart, a correlation may be seen and made to provide an enhanced depth-age relationship. More particularly, it should be appreciated that the two charts correlate relatively well as whenever the sea level was relatively high, the strontium values were low, and vice versa. In addition, somewhere about 5.7 million years ago, the sea level started dropping significantly. That process continued for about 200,000-300,000 years, until it started rising again. Somewhere about the time the sea level reached its nadir for that time period, based on the analysis set forth above, it is likely that celestite was formed due to exposure of the aragonite to the atmosphere. Thus, the spike in celestite at about 1180 feet can be correlated to a time of about 5.4 million years ago. Upon the sea level rising, the strontium levels became relatively steady for a long period of time as aragonite was building. A second strontium peak at around 800 ft depth suggests that a similar exposure occurred which is not clearly recorded in the sea level curve. Then as the sea level dropped and more strontium was released to the oceans, the strontium concentrations are observed to steadily increase.

Figure 4:
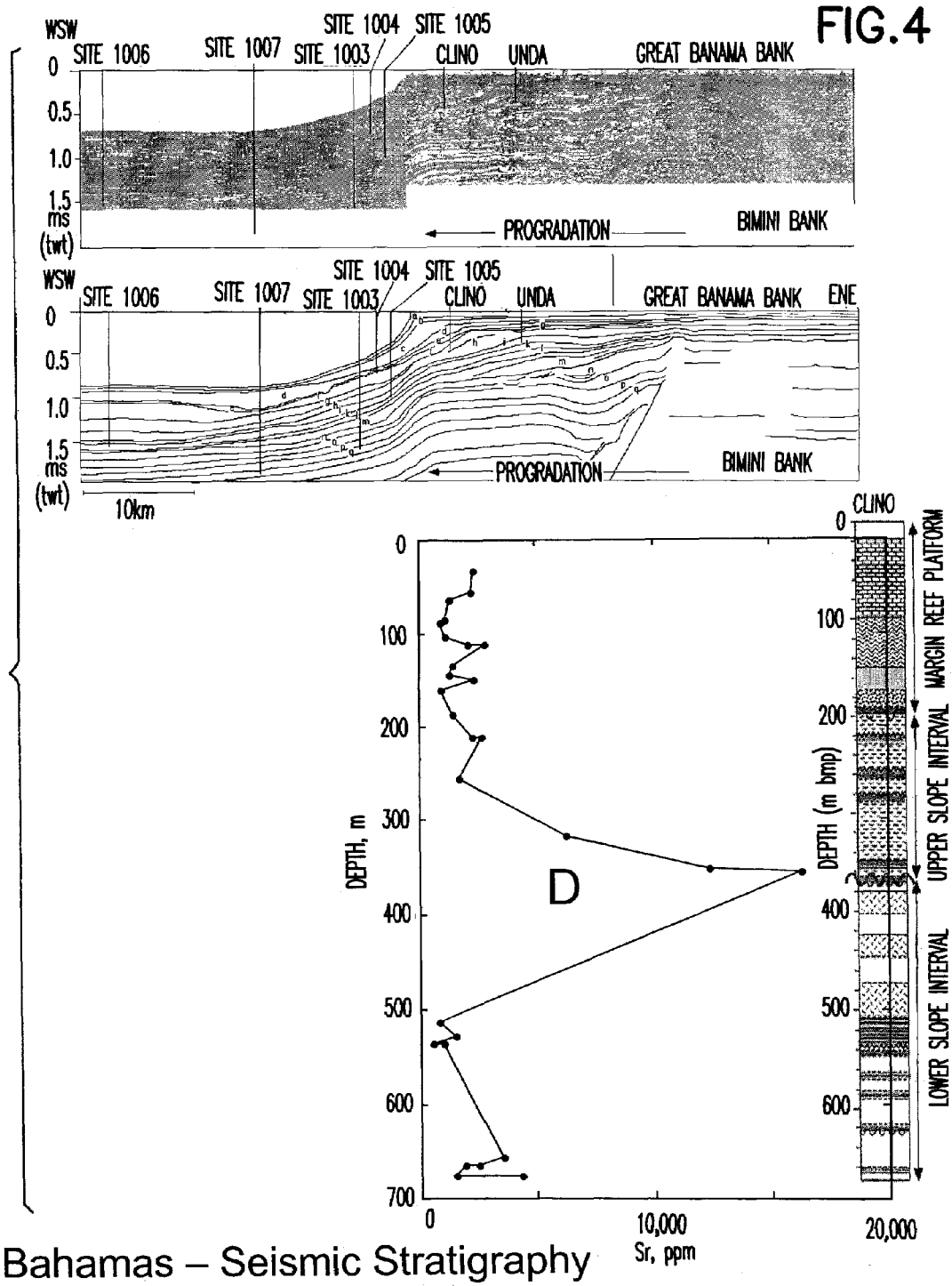
FIG. 4 is a composite of a first chart showing seismic data, a second chart showing sequence boundaries corresponding to sea level lows obtained using the seismic data, and a third chart showing strontium concentration versus depth in a level identified by the second chart in an analyzed formation.

According to another aspect of the invention measures of strontium in a borehole are used to correlate to information obtained via seismic exploration of the formation traversed by the borehole. As seen in the top left-hand chart of FIG. 4, seismic data for a formation may be obtained utilizing seismic sources and detectors (not shown). That data may be processed as is well known in the art to generate a chart such as seen in the bottom left-hand side of FIG. 4 which shows sequence boundaries corresponding to sea level lows. Thus, numerous strata are located over a range of about 70 km, and are labeled a-q, and a third chart showing strontium concentration versus depth in a level identified by the second chart in an analyzed formation. From the core samples taken in the same formation (from site Clino), the strontium levels of the formation are charted in the right-hand chart of FIG. 4. As can be seen, the strontium levels at the stratum d (D) (between about 300 and 400 meters deep) are relatively very large indicating a layer of celestite, which reflects the sea level low-stand that is also reflected in the seismic layering. Thus, the seismic and core data (which could be obtained via logging using one or more of the tools discussed above) correlate well.

According to another aspect of the invention, measures of strontium in multiple boreholes are correlated as horizons of constant time as opposed to the well known correlations of constant lithology as commonly practiced. More particularly, as indicated by the left-hand charts of FIG. 4, and as is well known in the art, formations assume angled configurations, with different time horizons having different depths at different locations. Utilizing strontium levels, and particularly where the strontium levels are extremely large, a time horizon identified in a first borehole (such as Site 1003 in FIG. 4) at a first depth may be correlated with the same time horizon identified in a second borehole (such as Clino in FIG. 4) at a different depth. Because the strontium levels are large only at very specific depths, the correlation of time horizons can be conducted at a much finer granularity using the strontium measurements than what can be accomplished using seismic analysis.

There have been described and illustrated herein embodiments of methods and apparatus for exploring geological formation utilizing strontium measurements. While particular embodiments of the invention have been described, it is not intended that the invention be limited thereto, as it is intended that the invention be as broad in scope as the art will allow and that the specification be read likewise. Thus, while particular apparatus and methods for measuring strontium downhole have been disclosed, it will be appreciated that other apparatus and methods could be used as well. It will therefore be appreciated by those skilled in the art that yet other modifications could be made to the provided invention without deviating from its spirit and scope as claimed.

What is claimed is:

1. A method of investigating a geological formation traversed by a borehole, comprising:
   placing a tool in the borehole which is capable of obtaining information regarding strontium in the formation;
   moving the tool in the borehole and obtaining information regarding strontium in the formation adjacent the borehole;
   providing a log of strontium concentration in the formation as a function of formation depth or distance in the borehole; and
   providing chronostratigraphic information from the log of strontium concentration.

2. A method according to claim 1, wherein:
   said tool comprises an X-ray fluorescence tool.

3. A method according to claim 2, wherein:
   said X-ray fluorescence tool includes means for detecting an X-ray spectrum using at least the k-alpha peak of 14.2 keV and means for providing therefrom an indication a quantity of strontium.

4. A method according to claim 1, wherein:
   said tool comprises a capture gamma ray spectroscopy tool.

5. A method according to claim 1, wherein:
   said tool comprises a delayed neutron activation tool.

6. A method according to claim 1, further comprising:
   correlating said strontium concentration at least one depth in the formation chronostratigraphically to provide an absolute time correlation to said depth.

7. A method according to 6, wherein:
   said correlating comprises utilizing sea level curves over time.

8. A method according to claim 1, further comprising:
   generating a seismic study of the formation; and correlating information from said seismic study with information from said log of said strontium concentration.

9. A method according to claim 1, wherein said formation is traversed by a second borehole, said method further comprising:
   placing a tool in the second borehole which is capable of obtaining information regarding strontium in the formation;
   moving the tool in the second borehole and obtaining information regarding strontium in the formation adjacent the second borehole;
   correlating said information regarding strontium in the formation adjacent the first borehole with said information regarding strontium in the formation adjacent the second borehole; and
   providing chronostratigraphic information from the log of strontium concentration.

10. A method of investigating a geological formation traversed by a borehole, comprising:
    placing a tool in the borehole which is capable of obtaining information regarding strontium concentration in the formation;
    moving the tool in the borehole and obtaining information regarding strontium concentration in the formation adjacent the borehole as a function of depth; and
    correlating said strontium concentration at least one depth in the formation chronostratigraphically to provide an absolute time correlation to said depth.

11. A method according to claim 10, wherein:
    said tool comprises an X-ray fluorescence tool.

12. A method according to claim 11, wherein:
    said X-ray fluorescence tool includes means for detecting an X-ray spectrum using at least the k-alpha peak of 14.2 keV and means for providing therefrom an indication a quantity of strontium.

13. A method according to claim 10, wherein:
    said tool comprises one of a capture gamma ray spectroscopy tool and a delayed neutron activation tool.

14. A method according to claim 10, wherein:
    said correlating comprises utilizing sea level curves over time.

15. A method of investigating a geological formation traversed by a borehole, comprising:
    placing a tool in the borehole which is capable of obtaining information regarding strontium concentration in the formation;
    moving the tool in the borehole and obtaining information regarding strontium concentration in the formation adjacent the borehole;
    obtaining a seismic study of the formation; and
    correlating information from said seismic study with information from a log of said strontium concentration.

16. A method according to claim 15, wherein:
    said tool comprises an X-ray fluorescence tool.

17. A method according to claim 16, wherein:
    said X-ray fluorescence tool includes means for detecting an X-ray spectrum using at least the k-alpha peak of 14.2 keV and means for providing therefrom an indication a quantity of strontium.

18. A method according to claim 15, wherein:
    said tool comprises one of a capture gamma ray spectroscopy tool and a delayed neutron activation tool.

19. A method of investigating a geological formation traversed by at least two boreholes, comprising:
    placing a tool in a first of the two boreholes which is capable of obtaining information regarding strontium in the formation;
    moving the tool in the first borehole and obtaining information regarding strontium in the formation adjacent the first borehole;
    placing a tool in the second borehole which is capable of obtaining information regarding strontium in the formation;
    moving the tool in the second borehole and obtaining information regarding strontium in the formation adjacent the second borehole;
    correlating said information regarding strontium in the formation adjacent the first borehole with said information regarding strontium in the formation adjacent the second borehole; and
    providing chronostratigraphic information from the log of strontium concentration.

20. A method according to claim 19, wherein:
    said tool placed in said first borehole is an X-ray fluorescence tool, and said tool placed in said second borehole is an X-ray fluorescence tool.

* * * * *